US008402141B2

(12) United States Patent
Seraphin (10) Patent No.: US 8,402,141 B2
(45) Date of Patent: Mar. 19, 2013

(54) GRACEFULLY REESTABLISHING AN EXPIRED BROWSER SESSION

(75) Inventor: Vinod R. Seraphin, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 10/952,466

(22) Filed: Sep. 28, 2004

(65) Prior Publication Data

US 2006/0075110 A1   Apr. 6, 2006

(51) Int. Cl.
*G06F 15/16* (2006.01)
*G06F 7/04* (2006.01)
*G06F 3/00* (2006.01)

(52) U.S. Cl. ............ 709/227; 709/228; 709/229; 726/3; 715/738

(58) Field of Classification Search .................... 709/225
See application file for complete search history.

(56) References Cited

U.S. PATENT DOCUMENTS

| | | | | |
|---|---|---|---|---|
| 6,557,038 | B1 * | 4/2003 | Becker et al. ................. | 709/227 |
| 6,812,938 | B2 * | 11/2004 | Pinnell .......................... | 715/741 |
| 6,950,980 | B1 * | 9/2005 | Malcolm ....................... | 715/207 |
| 6,963,996 | B2 * | 11/2005 | Coughlin ......................... | 714/4 |
| 7,003,574 | B1 * | 2/2006 | Bahl ............................ | 709/228 |
| 7,246,230 | B2 * | 7/2007 | Stanko .......................... | 713/155 |
| 7,379,980 | B1 * | 5/2008 | Gilbert .......................... | 709/220 |
| 2001/0037469 | A1 * | 11/2001 | Gupta et al. .................. | 713/202 |
| 2003/0101269 | A1 * | 5/2003 | Choi ............................. | 709/228 |
| 2003/0132958 | A1 * | 7/2003 | Himmel et al. ............... | 345/745 |
| 2003/0233361 | A1 * | 12/2003 | Cady ............................. | 707/10 |
| 2004/0073660 | A1 * | 4/2004 | Toomey ........................ | 709/224 |
| 2004/0215703 | A1 * | 10/2004 | Song et al. .................... | 709/201 |
| 2004/0250059 | A1 * | 12/2004 | Ramelson et al. ............ | 713/150 |
| 2005/0198247 | A1 * | 9/2005 | Perry et al. .................... | 709/223 |
| 2005/0273388 | A1 * | 12/2005 | Roetter ......................... | 705/14 |
| 2006/0036875 | A1 * | 2/2006 | Karoubi ........................ | 713/191 |
| 2006/0095558 | A1 * | 5/2006 | Christian ...................... | 709/224 |
| 2006/0155985 | A1 * | 7/2006 | Canard et al. ................. | 713/156 |

OTHER PUBLICATIONS

Katsuhiko Momoi, Arun Ranganathan, "How to Turn Off Form Autocompletion", May 23, 2003.*

* cited by examiner

*Primary Examiner* — Ranodhi Serrao
(74) *Attorney, Agent, or Firm* — David A. Dagg (57) ABSTRACT

A system for re-establishing an expired user session in which a separate session expiration time cookie is provided to communicate the session expiration time from the Web server to the browser. When a user performs an action requiring server action, a determination is made as to whether the current user session has expired, or is near expiration. If so, the user action is stored, and a separate browser window is opened. A protected page is loaded which closes the browser window. The user first encounters the login page and enters the proper credentials to log-in to the server. As part of displaying the protected page, the server updates the user session expiration time cookie to the new session expiration time. The original window then detects the new session expiration time the prior invoked action is re-attempted.

19 Claims, 6 Drawing Sheets

GRACEFULLY REESTABLISHING AN EXPIRED BROWSER SESSION

FIELD OF THE INVENTION

The present invention relates generally to the field of data processing, and in particular to a system and method for gracefully reestablishing an expired browser session.

BACKGROUND OF THE INVENTION

As it is generally known, the World Wide Web ("Web") is a major service on the Internet. Computer systems acting as Web servers store Web page documents that may include text, graphics, animations, videos, and other content. Web pages are accessed by client computer users via Web browser software, such as Internet Explorer® provided by Microsoft, or Netscape Navigator® provided by Netscape Communications Corp., and others. The browser program renders Web pages on the user's screen, and automatically invokes additional software as needed. Many software programs running over the Web ("Web applications") are provided through browser programs. Web applications also often require some type of user authentication, such as a user name and password, for a user to establish a user session. These user sessions may be limited in time, and therefore can expire, causing the user to have to re-authenticate.

Web applications may involve the submission of significant amounts of data from users through Web forms, consisting of formatted screen displays designed for inputting information to a program. A problem in existing systems is that when a user submits a Web form after a user session has expired, the data entered into the form is typically lost, and the user encounters a login page. When opening the login page, such as a dialog box, existing systems also cause the login page to be displayed within a window having a window size that is not conducive to entry of the login information.

Some J2EE (Java 2 Platform, Enterprise Edition) Web servers and Web applications offer a solution in which the data posted by the user is saved at the Web application server. The server then presents a login page, and continues the original post once the proper login information has been entered. One drawback to this approach is that if the proper username and password are not immediately entered, the posted data will still be lost. Other Web Servers do not offer even such limited capability to retain posted data on an HTTP post when a session has expired.

It would therefore be desirable to have a new system for processing Web forms that enables data entered into a Web form to be preserved across the expiration of a user session, and that gracefully reestablishes an expired browser session.

SUMMARY OF THE INVENTION

To address the above described and other shortcomings of existing systems, a new system and method for gracefully reestablishing an expired user session are disclosed. In the disclosed system, a separate user session expiration time cookie is provided to communicate a user session expiration time from a Web server to a browser. The Web server further provides the browser with user session validation and re-establishment routines that include logic for checking whether a current user session has expired, or is near expiration. When a user performs an action requiring server action, the disclosed system determines whether the current user session has expired, or is near expiration. If either of these cases are true, the disclosed system stores the user action just invoked, opens a separate, correctly sized browser window, and loads a protected page which causes the current browser window to close. For the protected page to be displayed, the user first encounters a login page and enters the proper credentials to log-in to the server. Once the user is authenticated, the server responds with the requested protected page and sends along with it a user session expiration time cookie including a new session expiration time. The loaded page causes the separate browser window to close. At this point, the prior invoked user action can be re-attempted. Since the user session is now not expired, or at risk of immediate expiration, the requested user action can be completed properly. In one embodiment, the user session expiration time cookie further includes indication of whether a renewable or fixed user session expiration time is being used, and the session is explicitly torn down if there is insufficient time to complete the requested action in the case of a non-renewable user session expiration time.

Advantageously, the disclosed system allows a form page filled out by the user to be undisturbed on the client computer system and re-used, while obtaining and maintaining the latest user session expiration information. User session time information need not be embedded within Web pages, since the user session expiration time cookie is not stored within a cached Web page inside the browser cache. If subsequent activity, for example within other windows associated with the same Web application, extends the current user session, the original window has access to the latest user session expiration information, and will know that the user session has not expired.

By using the actual user session expiration time in the user session expiration time cookie, the disclosed system allows for convenient comparison to a current time on the client computer system. The disclosed system may be embodied to detect if and when an expired user session has been re-established, and supports auto-completion of a user action in such an event. An embodiment of the disclosed system may include polling the user session expiration time cookie for some interval of time to obtain an updated user session expiration time. The user session expiration time will have changed in the event that the user successfully re-authenticates within the separately provided browser window. If a user session expiration time cookie with a sufficiently later session expiration time is found, then the disclosed system completes the requested action.

In another embodiment, the disclosed system may operate to "ping" the server prior to making a submit, in order to determine whether the server is up and running. This feature may be used to address scenarios in which a network link is intermittently down, or to discover that a server was brought down before the user's session expired.

Thus there is disclosed a new system for processing Web forms that enables data entered into a Web form to be preserved across the expiration of a user session, and that gracefully reestablishes an expired browser session.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
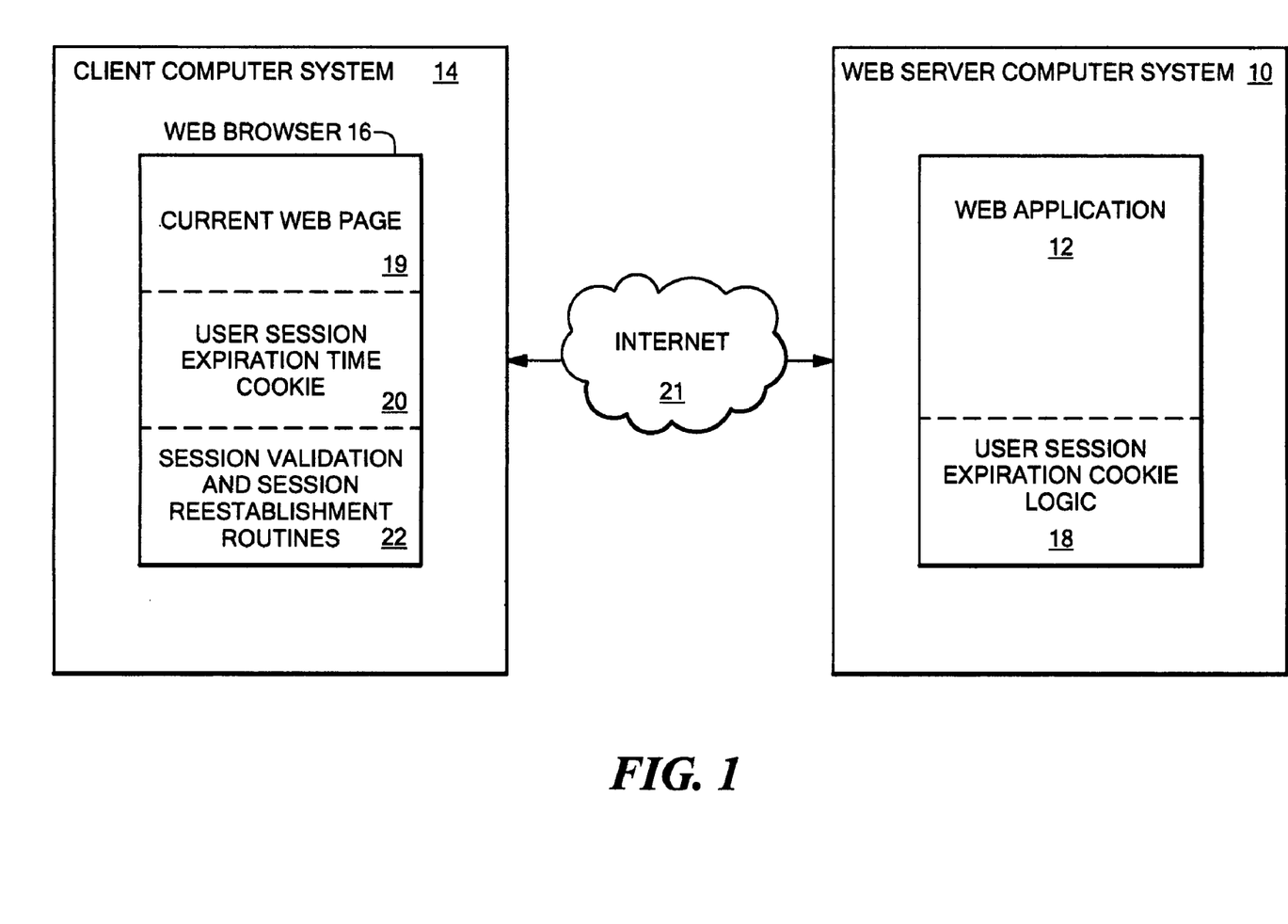
FIG. 1 is a block diagram illustrating components operating in an execution environment for an embodiment of the disclosed system.

FIG. 1 is a block diagram illustrating components operating in an execution environment for an embodiment of the disclosed system. As shown in FIG. 1, a Web server computer system 10 including Web application software 12 is communicably coupled to a client computer system 14 including a Web browser program 16. The Web application software 12 is shown including user session expiration cookie logic 18, and the Web browser 16 includes a current Web page 19, at least one user session expiration time cookie 20, and session validation and session re-establishment routines 22. The Web server computer system 10 and client computer system 14 may consist of any specific type of computer system, for example including one or more processors, program memory for storing program code executable on the processor(s), input/output devices such as communication and/or network adapters, removable program storage media, and the like. The Web server computer system 10 and client computer system 14 may be connected using any appropriate communication system, such as the Internet 21, a local area network, or other specific type of network.

Figure 2:
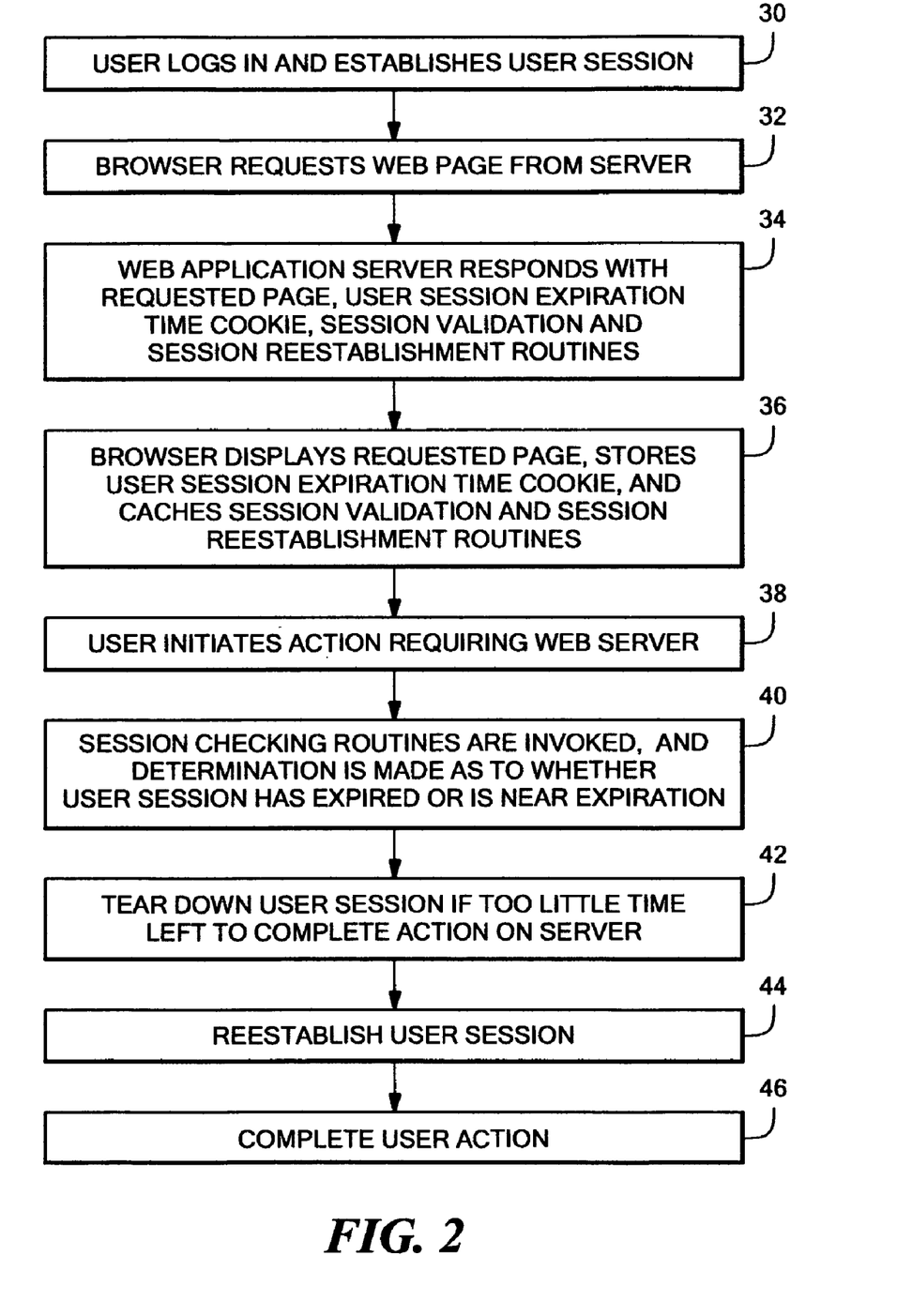
FIG. 2 is a flow chart illustrating steps performed in an embodiment of the disclosed system.

FIG. 2 is a flow chart illustrating steps performed in an embodiment of the disclosed system. At step 30, a user logs into a Web application to establish a user session. Any specific kind of authentication technique may be used to log the user in, such as prompting the user for a user name and password. At step 32, the Web browser sends a request for a Web page from the Web application. When the Web server system receives the Web page request, it responds at step 34 by sending the requested page, as well as a "cookie" including the session expiration time. The user session expiration time cookie transmitted from the Web server system to the Web client is part of the HTTP response header for a retrieved page. The Web application server includes user session expiration cookie logic 18 that is operable to provide a user session expiration time that may be either a renewable session expiration time, or a fixed session expiration time.

A renewable session expiration time is one that is reset to a new expiration time each time an action is received from the client. The user session expires at the server only if no user activity occurs prior to the session expiration time. A fixed session expiration time is one that is set to a fixed time when a user session is established, and cannot be reset or renewed. The session expires at this fixed time regardless of any user activity. The use of a renewable or fixed expiration time may be determined on an application by application basis. With either approach, when the session expires, the user will need to re-authenticate to establish another valid session.

In one embodiment, the user session expiration time cookie transmitted from the Web server to the Web client communicates both user session expiration time and an indication of whether a renewable or fixed (non-renewable) time period user session authentication scheme is being used at the Web server. Any specific type or kind of indication may be used in this regard.

At step 36, the browser receives the response from the Web server, which in addition to the requested Web page includes a potentially updated user session expiration cookie, as well as the user session validation and user session re-establishment routines. For example, the user session expiration cookie may be loaded by the browser into the current page's Document Object Model (DOM), so that it is then accessible programmatically by Script executing within the current Web page. While the user session expiration cookie need not necessarily be stored persistently to disk, an alternative embodiment may operate to "cache" the user session expiration cookie such that it is available after the browser window is closed and a new browser window is opened.

The user session validation and user session re-establishment routines may be made up of any specific kind of program code and/or scripting language, such as JavaScript, and need not be encrypted. The user session validation and user session re-establishment routines need only be loaded once, for example when the first Web page relating to a given Web application is downloaded from a Web server to a client computer system. This would occur if the first page (and all subsequent pages of the application) referenced a specific external script file, which contained these routines. The file containing these routines would be retrieved from the server as part of rendering the first page of the application, and would then be available within the browser cache when referenced by subsequent pages. Alternatively, the session validation and user session re-establishment routines may be included within each page of a Web application.

At step 38 the user initiates a user action on the client computer system, which requires at least some processing by Web application software executing remotely on the Web server computer system. The action initiated at step 38 may be any user action requiring processing by the Web application server software. For example, the user action represented by step 38 may include or consist of a "form.submit" command issued when the user has completed a Web form, and may request that data in a Web form be transmitted to the Web server computer system. The user action initiated at step 38, for example, may be any action resulting in an HTTP POST command or the like, that is used to send text to a Web server for processing. The POST command is an example of a method that is implemented in HTML files for sending typed-in forms to the Web server.

At step 40, prior to invoking the "form.submit" as part of completing the user initiated action of step 38, the user session validation routines are invoked within the browser on the client computer to determine whether the current user session has expired, or is nearing expiration. For example, prior to calling form.submit( ), a special routine is called to verify that the current user session is still valid. In one embodiment, such a verifySession routine might be passed information which is used to determine what logic to invoke immediately if the session is valid. If the session is not valid, this would need to be remembered so that it might be used to complete the operation once the session is re-established. One means of passing such information is as a Javascript String which would be evaluated to invoke the proper routines to complete the user action.

The user session validation routines may compare an expiration time stored in the user session expiration time cookie to a current time on the client computer system to determine whether the current user session has expired. Those skilled in the art will recognize that various techniques may be used to resolve time discrepancies between the client computer system and the server computer system. For example, in an embodiment of the disclosed system, a special post may be sent to the Web server to retrieve the actual server time. A current client time may then be used to determine a client-server time difference. This time difference may be then used to take into consideration typical scenarios where the Web client and Web server's clocks are not synchronized. The time difference once calculated may also be saved in some manner at the browser so that it need not be calculated again for subsequent pages that comprise the Web application.

Additionally at step 40, a minimum remaining time period may be predefined and referred to. If the time remaining in the current session is greater than or equal to a minimum remaining time, the initiated user action is completed at step 46 following step 40. If the time remaining in the current user session is less than such a minimum remaining time, the user session is determined to be too close to expiration for the requested action to be completed. Such a minimum remaining time threshold may be statically defined, or dynamically determined based on the amount of time needed to perform the user action initiated at step 38. For example, the minimum remaining time threshold may reflect the amount of communication or other delay between the client computer system and the server computer system, the amount of time needed to process the user action in the Web server software, and/or other parameters.

In either the case where the user session has expired, or is determined to be within a minimum remaining time before session expiration, the Web application code running in the browser operates to save the data in the initiated user action, so that the action can be re-submitted and completed in the event that the user is successfully re-authenticated and the user session re-established.

Step 40 may include attempting to load a blank XML page from the Web server, possibly within a hidden HTML element within the page, so it doesn't disrupt the current page. The loading of the blank page would renew the user session expiration time if a renewable user authentication session time is in use, and the session has not expired. In that case, the new user session expiration time will be detected, and the user action will be completed after step 40 at step 46. Otherwise, if the load fails, then the user session has expired, and step 40 is followed by step 44.

If no user session expiration time cookie is found at step 40, then an embodiment of the disclosed system may determine that a session based authentication mode is not in use, and the initiated user action is completed at step 46 following step 40.

In the case where the user session is determined to be too close to expiration for the initiated user action to be completed and a determination is made that a non-renewable session expiration scheme is being employed at the Web server, then the user session validation routines in the browser operate to tear down the current user session at step 42. This tearing down may include deletion of the current user session cookie as well as any user session expiration time cookie. If a renewable session expiration scheme is being employed at the server, and the user session is determined to be too close to expiration for the initiated user action to be completed, then a simple request to retrieve a simple XML page within a hidden HTML element (such as an XML island or XMLHttpRequest object) is done. If this succeeds, the session will have been renewed (extended), and the original action may be completed. If it fails, the logic to establish a new session is invoked.

At step 44, rather than send the user action from the client system to the server system, the Web page in the browser requests a special protected resource from the Web application server software be loaded within a new browser window. The new window is sized properly for, and capable of handling a login screen that is returned by the Web application server software. The user is then re-authenticated and the user session re-established by the user session reestablishment routines that were previously cached in the browser.

For example, at step 44, the disclosed system may operate to open a Web page which will simply close when it is successfully loaded within a new window, and possibly specifying a pre-determined parameter (e.g. "&Login") to force a login screen to be displayed. This results in the user session expiration time cookie being updated. A "named" window may be used in this step to eliminate the possibility of having multiple login windows for the same server for the same user at the same time. A non-visible window name may be used that is a combination of some unique string to identify login windows (such as "Login"), the current user name and the server's hostname.

At step 46, in response to the user session expiration time having been successfully renewed or the user session re-established as necessary, the user session re-establishment routines operate to submit the user action that was originally initiated at step 38, and that was detected at step 40. The submission at step 46 may include one or more POST commands.

Figure 3:
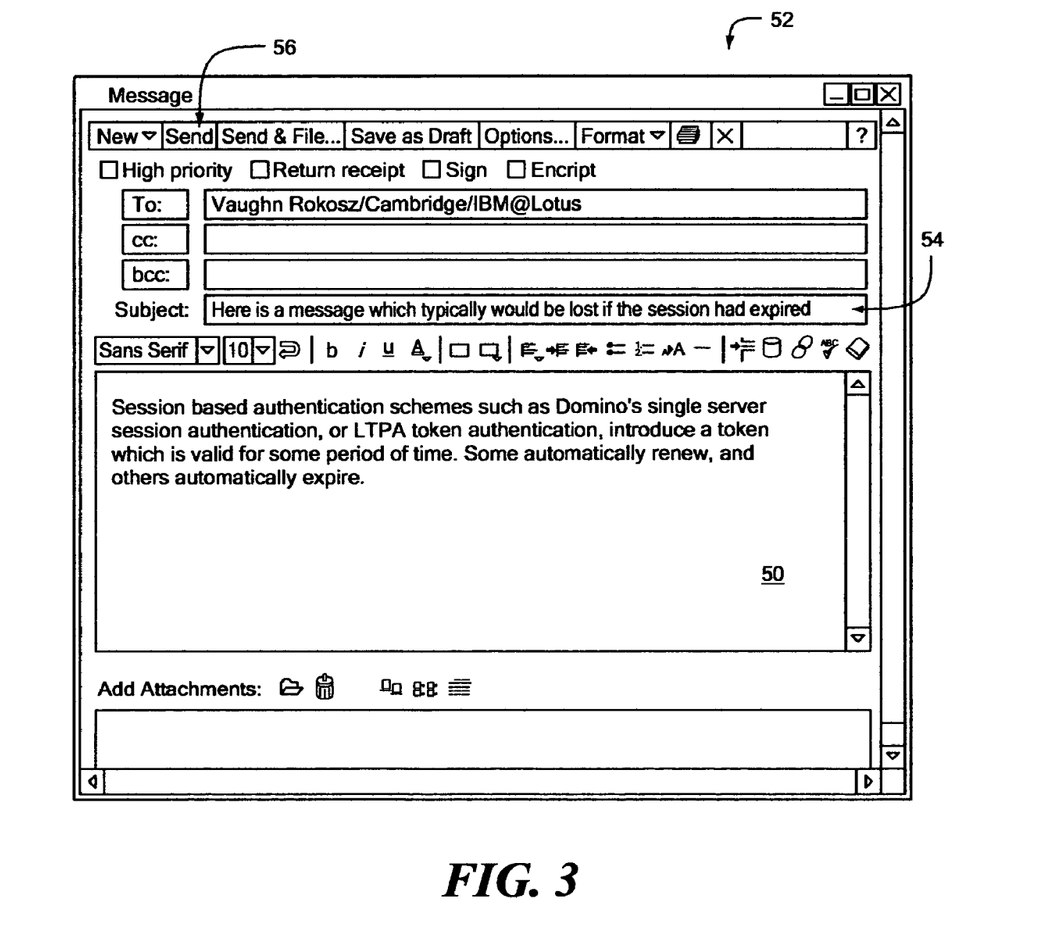
FIG. 3 is a screen shot illustrating a user composing a message using a Web form, during operation of an embodiment of the disclosed system.

FIG. 3 is a screen shot illustrating a user composing a message 50 using a Web form 52, and having a message identifier shown for purposes of example as the subject line 54. During operation of an embodiment of the disclosed system, the user may, while composing the message 50 but before sending it, go to another activity, such as a meeting, just leave the widow containing the Web form 52 to go work on something else. The previously established user session may expire while the user is away, and the user may subsequently come back to the Web form 52 and attempt to finish composing the message and send it, for example by clicking on the send button 56.

Figure 4:
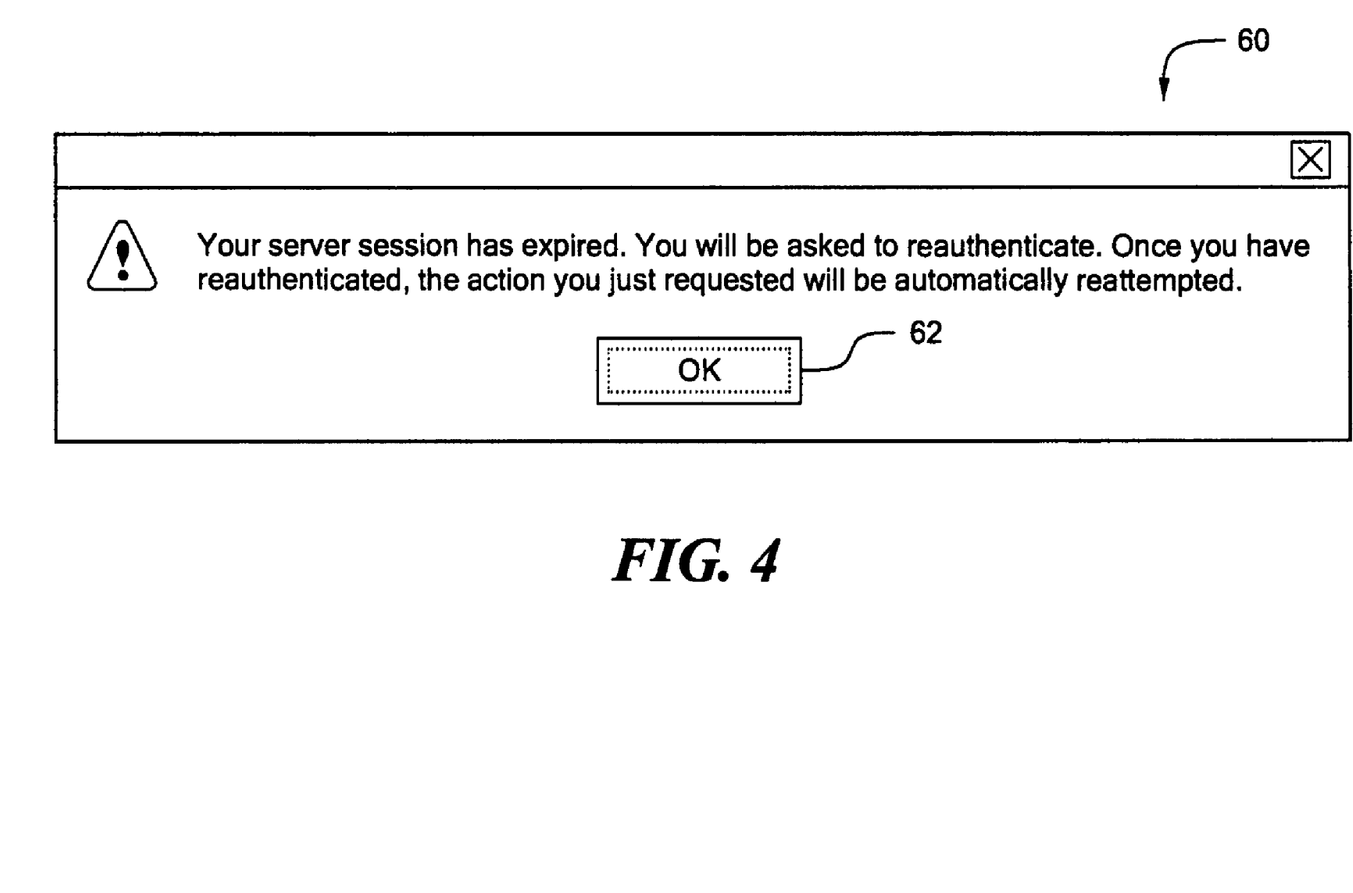
FIG. 4 is a screen shot showing an example of a user session expiration notification provided in an embodiment of the disclosed system.
Figure 5:
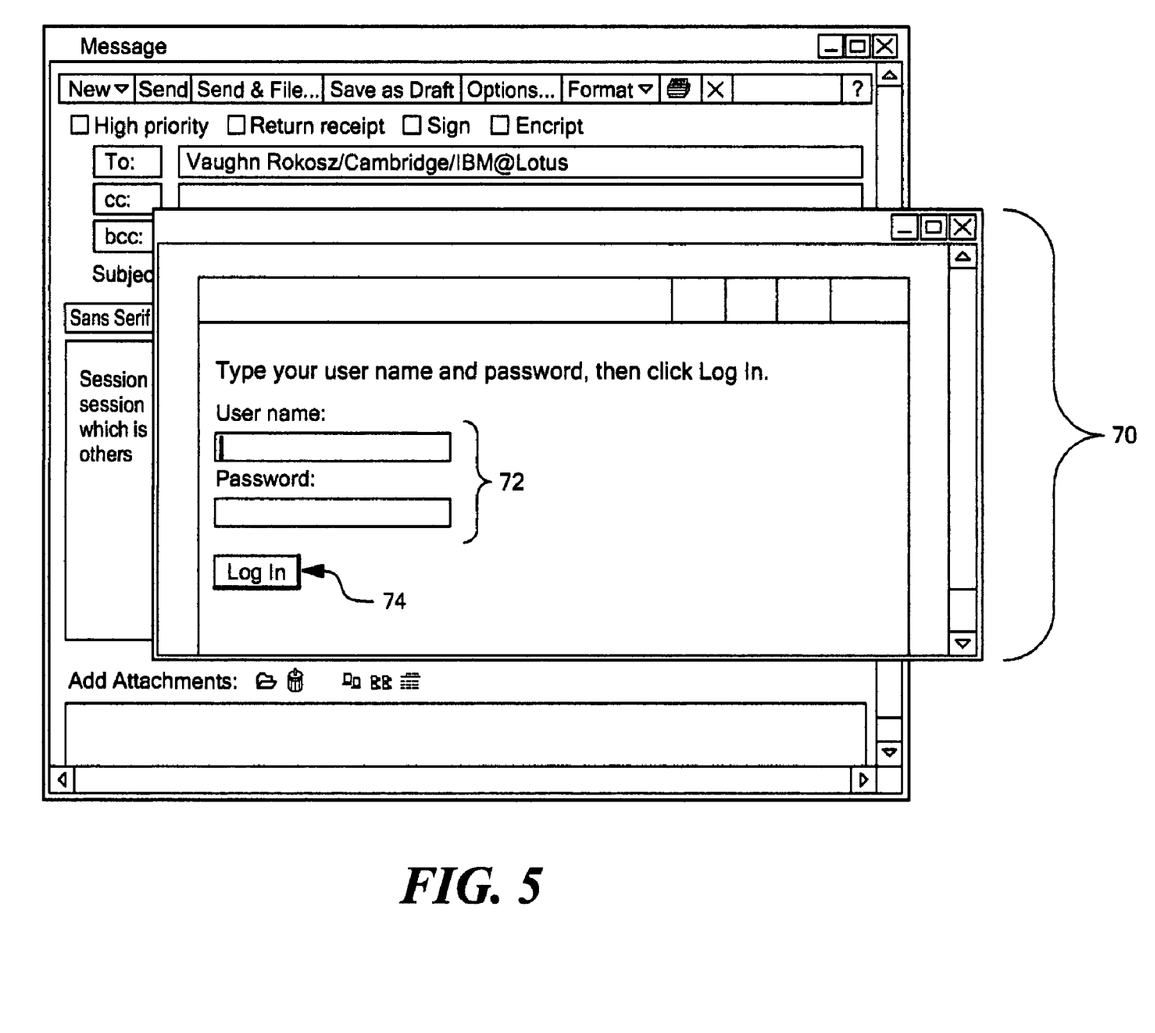
FIG. 5 is a screen shot showing a portion of a user interface in which a separate login window has been opened to request login information from a user.
Figure 6:
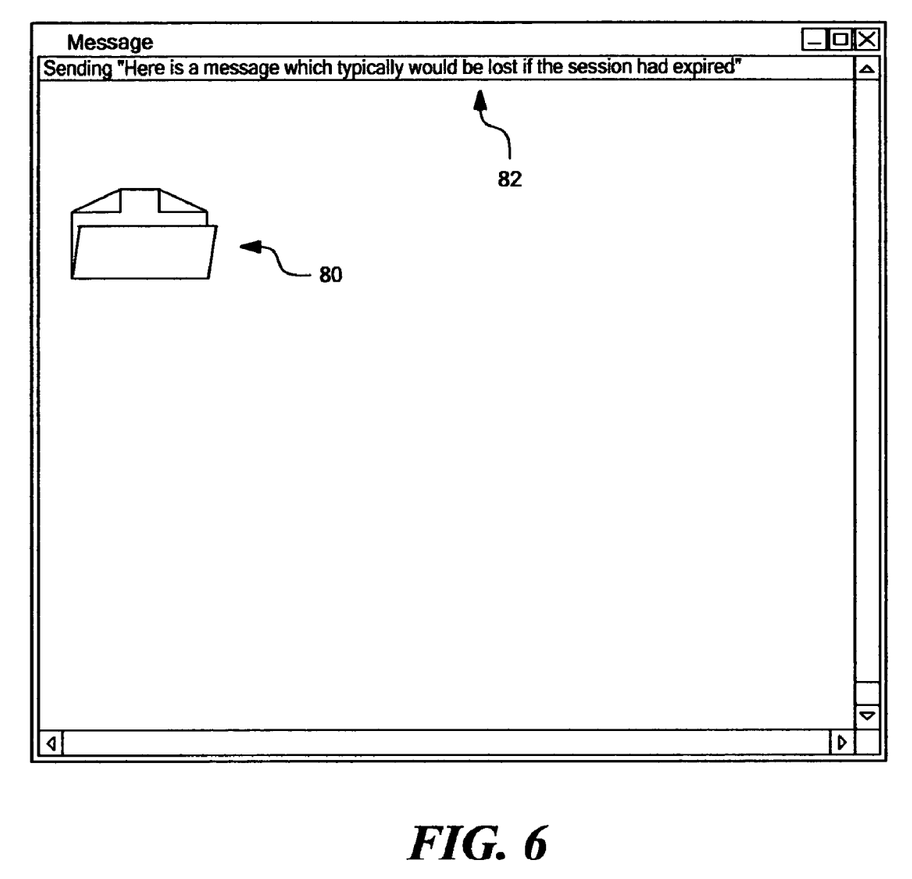
FIG. 6 is a screen shot showing an example of a graphical indication that a prior requested action has been completed.

FIG. 4 is a screen shot showing an example of a user session expiration notification 60 provided in an embodiment of the disclosed system. The notification 60 is presented as a result of the user attempting to send the previously composed message either after the user session has been determined to have expired, or at a point in time that is determined to be too close to the expiration time of the user session for the action to be completed. After clicking on the OK button 62, FIG. 5 shows how a separate login window 70 is opened to request login information 72 from the user. After the user provided the requested login information, and clicked on the login button 74, a graphical indication 80 as shown in FIG. 6 may be presented indicating that the prior requested action has been completed. In the example of FIG. 6, the contents of the subject of the message is shown 82 to identify the message that has been sent.

The disclosed system may be embodied such that the action requested by the user, but not completed because the user session had expired, or because there was insufficient time left in the user session to complete the request, is either automatically completed without further user action, or the user is presented with the completed Web form and prompted to re-submit it. Accordingly, the message shown in FIG. 4 may be embodied to alternatively indicate that the attempted action will only be completed upon receipt of some affirmative user action following re-authentication of the user.

Accordingly, as described above, the disclosed system brings up a new window to obtain login information from the user. In the main window, in which the user was entering information to a Web form, the disclosed system may wait to determine if the user has successfully re-established the session. For example, in the main window, the program logic may check the cookie storing the session expiration time every few seconds to determine whether the user session expiration time has been successfully updated. This polling might also cease after some longer interval has expired. For example, such polling may be accomplished using JavaScript embedded in and/or referenced from Web pages that are part of a Web application, such as email, that includes some kind of Web form data entry. Since a separate login window is used, any entered information entered to a Web form in the main window is not disrupted or lost.

The disclosed system may advantageously be applied to any Web application or prolonged interaction with a Web site which might result in the user losing the data input to a form because the user session has expired. For example, Mortgage application sites often require users to fill in much information. If the user starts filling out some of this information and then puts the page aside because s/he was interrupted and then tries to complete the rest of the form and submit it later, the session might have expired and this last set of input would be lost.

The disclosed system may support various authentication modes. For example, some Web application servers allow for different authentication modes. These modes may include 1) single server authentication, in which a user's authentication is only good for one Web application server, and 2) multiple server authentication, also referred to as "single sign on" (SSO). Either of these authentication modes might enable a user session to be extended after receipt of each subsequent request. Such systems would operate to send back a user session expiration time having the new expiration time with each response from the server. For other systems, the expiration time may not be renewable in response to each request, and is instead fixed for each login. In situations where there is a fixed session expiration time, the user session expiration time included in the cookies provided from the Web server includes the fixed expiration time established when the user is first authenticated. Subsequent pages need not send back a session expiration time cookie with the same value as the current value known by the browser. The browser sends back the same session expiration time cookie it previously received, so if the time hasn't changed, the cookie need not be updated by the server. In any case, the user session expiration time contained in the user session expiration time cookie may, for example be formatted as a UTC (Coordinated Universal Time) time, and may be formatted in any known textual formatting for dates and times such as one of the formats defined by ISO 8601.

The disclosed system provides many advantages over previous systems, including the fact that the original Web page containing the Web form and entered data can be cached by the browser on the Web client computer system, and re-used, while the latest user session expiration time information is available separately in a cookie, independent of any cached or stored Web pages. Accordingly, if activity within other windows in the user interface extends the user session, a main Web form window will still have access to the latest user session expiration time information. The disclosed system conveniently detects when a session has been re-established, supports automatic or explicitly requested completion of a previous user request, and may operate to poll for an updated user session expiration time cookie. In the case where a user session expiration time cookie with a sufficiently later session expiration time is found, the disclosed system is operable to complete the requested action. The disclosed system may further be embodied to optionally "ping" the Web application server prior to making a submit, in order to deal with scenarios where the network link is intermittently down, such as when a wireless connection is being used with a relatively poor signal, or when a Web application server system was brought down before the user's session expired.

Figure 7:
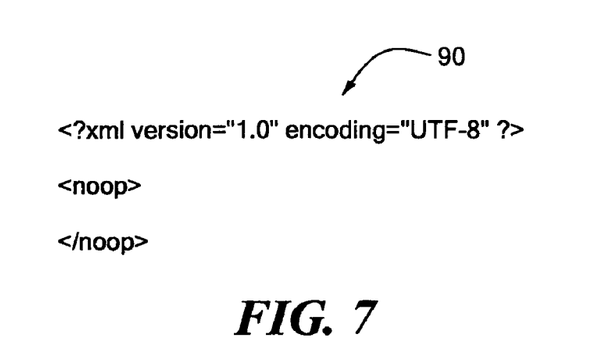
FIG. 7 is an example of a simple XML page requested for retrieval by an embodiment of the disclosed system.

For example, in one embodiment a request to retrieve a relatively very simple XML page, such as the XML page 90 shown in FIG. 7, may be issued to the Web server. If this page is returned, the session is valid and working. Otherwise the connection to the Web server is no longer valid.

FIG. 2 is a flowchart illustration of methods, apparatus (s) and computer program products according to an embodiment of the invention. It will be understood that each block of FIG. 2, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative screen displays, one skilled in the art will recognize that they may be embodied using a variety of specific screen displays. Accordingly, the invention should not be viewed as limited except by the scope and spirit of the appended claims.

I claim:

1. A method for maintaining user data across a user session expiration, comprising:

authenticating a user to establish a current user session between said user and an application;

receiving, at a client computer system, a user session expiration time cookie from a server computer system, said user session expiration time cookie including a user session expiration time, wherein said user session expiration time is a time at which said current user session will expire and the user will need to re-authenticate to establish another valid session with said application;

comparing, by a Web browser executing at said client computer system, prior to said Web browser submitting a user request for an action on said server computer system, a current time maintained at said client computer system with said user session expiration time;

in response to said comparing of said current time and said user session expiration time indicating that said current user session has expired, saving, by said Web browser executing at said client system, previously entered user data on said client computer system, and presenting a re-authentication form in a separate graphical user interface login window;

obtaining authentication information through said separate graphical user interface login window; and in the event that said authentication information is authenticated by said application software on said server computer system, submitting said user request using said stored, previously entered user data.

2. The method of claim 1, wherein said user session expiration time cookie includes an indication of whether a renewable user session expiration time scheme is being employed at said server computer system.

3. The method of claim 2, further comprising:
determining, by said Web browser executing at said client computer system, whether a difference between said current time and said user session expiration time is less than a minimum remaining time threshold; and in response to a determination by said Web browser that said difference between said current time and said user session expiration time is less than said minimum remaining time threshold, terminating, by said Web browser, said current user session, and establishing a new user session in the event that a renewable user session expiration time scheme is not being employed at said server computer system.

4. The method of claim 2, further comprising retrieving a predetermined XML Web page to cause the renewal of the user session in the event that a renewable user session expiration time scheme is being employed at said server computer system.

5. The method of claim 3, wherein said minimum remaining time threshold is statically defined.

6. The method of claim 3, wherein said minimum remaining time threshold is dynamically determined responsive to a time required to complete said user request.

7. The method of claim 1, wherein said completing said user request is performed automatically without further user action.

8. The method of claim 1, wherein said completing said user request is performed in response to receipt of an affirmative user action subsequent to said authentication information being authenticated that said user request is to be completed.

9. The method of claim 1, further comprising:
in the event that said user session is determined to have expired, polling for an updated user session expiration time cookie.

10. A system comprising:
at least one processor and at least one non-transitory computer readable storage medium, wherein said non-transitory computer readable storage medium has program code stored thereon for maintaining user data across a user session expiration, said program code comprising program code for authenticating a user to establish a current user session between said user and an application, program code for receiving, at a client computer system, a user session expiration time cookie from a server computer system, said user session expiration time cookie including a user session expiration time, wherein said user session expiration time is a time at which said current user session will expire and the user will need to re-authenticate to establish another valid session with said application, program code for comparing, by a Web browser executing at said client computer system, prior to said Web browser submitting a user request for an action on said server computer system, a current time maintained at said client computer system with said user session expiration time, program code for, in response to said comparing of said current time and said user session expiration time indicating that said current user session has expired, saving, by said Web browser executing at said client system, previously entered user data on said client computer system, and presenting a re-authentication form in a separate graphical user interface login window, program code for obtaining authentication information through said separate graphical user interface login window, and program code for, in the event that said authentication information is authenticated by said application software on said server computer system, submitting said user request using said stored, previously entered user data.

11. The system of claim 10, wherein said user session expiration time cookie includes an indication of whether a renewable user session expiration time scheme is being employed at said server computer system.

12. The system of claim 11, said program code further comprising:
program code for determining, by said Web browser executing at said client computer system, whether a difference between said current time and said user session expiration time is less than a minimum remaining time threshold; and program code for, in response to a determination by said Web browser that said difference between said current time and said user session expiration time is less than said minimum remaining time threshold, terminating, by said Web browser, said current user session, and establishing a new user session in the event that a renewable user session expiration time scheme is not being employed at said server computer system.

13. The system of claim 11, said program code further comprising program code for retrieving a predetermined XML Web page to cause the renewal of the user session in the event that a renewable user session expiration time scheme is being employed at said server computer system.

14. The system of claim 12, wherein said minimum remaining time threshold is statically defined.

15. The system of claim 12, wherein said minimum remaining time threshold is dynamically determined responsive to a time required to complete said user request.

16. The system of claim 10, wherein said completing said user request is performed automatically without further user action.

17. The system of claim 10, wherein said completing said user request is performed in response to receipt of an affirmative user action subsequent to said authentication information being authenticated that said user request is to be completed.

18. The system of claim 10, said program code further comprising:
   program code for, in the event that said user session is determined to have expired, polling for an updated user session expiration time cookie.

19. A computer program product comprising:
   a non-transitory computer readable storage medium, wherein said non-transitory computer readable storage medium has program code stored thereon for maintaining user data across a user session expiration, said program code comprising
      program code for authenticating a user to establish a current user session between said user and an application,
      program code for receiving, at a client computer system, a user session expiration time cookie from a server computer system, said user session expiration time cookie including a user session expiration time, wherein said user session expiration time is a time at which said current user session will expire and the user will need to re-authenticate to establish another valid session with said application,
      program code for comparing, by a Web browser executing at said client computer system, prior to said Web browser submitting a user request for an action on said server computer system, a current time maintained at said client computer system with said user session expiration time,
      program code for, in response to said comparing of said current time and said user session expiration time indicating that said current user session has expired, saving, by said Web browser executing at said client system, previously entered user data on said client computer system, and presenting a re-authentication form in a separate graphical user interface login window,
      program code for obtaining authentication information through said separate graphical user interface login window, and
      program code for, in the event that said authentication information is authenticated by said application software on said server computer system, submitting said user request using said stored, previously entered user data.

* * * * *